United States Patent
Conley et al.

(10) Patent No.: US 9,618,155 B2
(45) Date of Patent: Apr. 11, 2017

(54) APPARATUS AND METHOD FOR CONTROLLING A LUBRICATION UNIT USING FLOW RATE FEEDBACK

(71) Applicant: Lincoln Industrial Corporation, St. Louis, MO (US)

(72) Inventors: Paul G. Conley, St. Charles, MO (US); Viktor Alekseyev, Creve Coeur, MO (US)

(73) Assignee: Lincoln Industrial Corporation, St. Louis, MO (US)

(*) Notice: Subject to any disclaimer, the term of this patent is extended or adjusted under 35 U.S.C. 154(b) by 183 days.

(21) Appl. No.: 14/134,849

(22) Filed: Dec. 19, 2013

(65) Prior Publication Data

US 2015/0176762 A1    Jun. 25, 2015

(51) Int. Cl.
*F16N 29/02* (2006.01)
*F16N 13/06* (2006.01)

(52) U.S. Cl.
CPC ............ *F16N 29/02* (2013.01); *F16N 13/06* (2013.01); *F16N 2013/063* (2013.01)

(58) Field of Classification Search
CPC .................................. F16N 29/02; F16N 13/06
See application file for complete search history.

(56) References Cited

U.S. PATENT DOCUMENTS

| | | | |
|---|---|---|---|
| 2,875,318 A | 2/1959 | Long | |
| 4,445,168 A * | 4/1984 | Petryszyn | F16N 29/02 184/6.1 |
| 4,862,379 A * | 8/1989 | Fujimoto | G05B 19/414 700/169 |
| 4,967,881 A * | 11/1990 | Meuer | B60R 17/02 184/6.4 |
| 5,125,480 A | 6/1992 | Gregory et al. | |
| 5,228,469 A * | 7/1993 | Otten | A01G 25/16 137/466 |
| 6,609,070 B1 | 8/2003 | Lueck | |

(Continued)

FOREIGN PATENT DOCUMENTS

| | | |
|---|---|---|
| AU | 2014274535 A1 | 7/2015 |
| WO | 9213300 A1 | 8/1992 |
| WO | 2008145235 | 4/2008 |

OTHER PUBLICATIONS

International Preliminary Report on Patentability issued Dec. 1, 2009 regarding PCT/EP2008/003243, 20 Pages.

(Continued)

*Primary Examiner* — William E Dondero
*Assistant Examiner* — Mark K Buse
(74) *Attorney, Agent, or Firm* — Senniger Powers LLP (57) ABSTRACT

A lubrication unit for delivering lubricant in a system and a method for controlling the unit. The lubrication unit includes a reservoir, a motor, and a pump. The lubrication unit has a flow rate sensor mounted downstream from the pump for measuring a flow rate of lubricant. The lubrication unit includes a control unit operatively connected to the flow rate sensor and the motor for controlling operation of the motor. The control unit includes an input selector for selecting at least one characteristic selected from a group consisting of a volume and a flow rate of lubricant pumped by the pump. The control unit adjusts motor speed to obtain the selected characteristic.

6 Claims, 6 Drawing Sheets

(56) References Cited

U.S. PATENT DOCUMENTS

| | | |
|---|---|---|
| 6,886,606 B2 | 5/2005 | Few et al. |
| 6,912,427 B1 | 6/2005 | Pattee et al. |
| 2007/0050096 A1 | 3/2007 | Mattes |
| 2011/0279261 A1* | 11/2011 | Gauger ............... F16P 3/14 340/539.1 |
| 2012/0132483 A1* | 5/2012 | Conley ............... F16N 7/14 184/6.4 |
| 2012/0247876 A1* | 10/2012 | Kreutzkamper ........ F16N 7/385 184/26 |
| 2013/0161130 A1* | 6/2013 | Alexander .............. F16N 13/14 184/32 |
| 2013/0277148 A1* | 10/2013 | Beck ................... F16N 7/38 184/6.4 |
| 2015/0176762 A1 | 6/2015 | Conley et al. |

OTHER PUBLICATIONS

Examination Search Report dated Oct. 11, 2016 in related Canada Application 2,875,318, 3 Pages.

* cited by examiner

APPARATUS AND METHOD FOR CONTROLLING A LUBRICATION UNIT USING FLOW RATE FEEDBACK

FIELD OF THE INVENTION

The present invention generally relates to apparatus and method for supplying lubricant, and more particularly to an apparatus and method of controlling lubrication units using flow rate feedback.

BACKGROUND OF THE INVENTION

This invention has particular application to automatic lubrication systems for supplying lubricant to multiple points of lubrication at predetermined intervals and/or in predetermined amounts. Lincoln Industrial sells such automated systems under the Quicklub®, Centro-Matic®, and Helios® trademarks. The Quicklub® system includes a reservoir for holding a supply of lubricant, a stirrer for stirring the lubricant, and an electric or pneumatic pump for pumping lubricant from the reservoir to one or more progressive metering (divider) valves each of which operates to dispense lubricant to multiple points of lubrication. Reference may be made to U.S. Pat. No. 6,244,387, incorporated herein by reference, for further details regarding an exemplary Quicklub® system. The Centro-Matic® system is similar to a Quicklub® system except that lubricant from the pump is delivered through a single supply line to injectors each operating to dispense a metered amount of lubricant to a single lubrication point. Reference may be made to U.S. Pat. No. 6,705,432, incorporated herein by reference, for further details regarding an exemplary Centro-Matic® system. The Helios® system is a dual line system.

In some lube systems, a known volume of lubricant is typically dispensed during each pump piston stroke. Knowing the volume of lubricant dispensed during a piston stroke enables ready calculation of an aggregate amount of lubricant dispensed and/or a flow rate of lubricant dispensed during a given interval. Under certain conditions, lubricant does not entirely fill the pump cylinder. If lubricant does not fill a total volume of the pump cylinder during each stroke, the aggregate amount of lubricant dispensed and the flow rate cannot be determined absent additional equipment. One such example is when lubricant is required in extreme cold temperatures (e.g., below 20° F.), the lubricant becomes more viscous and frequently results in an inability to draw sufficient suction to fill the pump cylinder. In lube systems where pump operation is controlled by determining the amount of lubricant dispensed or the lubricant flow rate from pump cylinder volume, not filling the cylinder may result in insufficient lubricant being dispensed to the lubrication points. Thus, there is a need for a lube system in which the pump is controlled directly from flow rate measurements.

SUMMARY OF THE INVENTION

In one aspect of the present invention, a method controls a lubrication unit having a motor driven pump and flow rate sensor. The method comprises the steps of driving the pump at a predetermined speed and measuring flow rate provided by the pump when driven at the predetermined speed. In addition, the method includes adjusting the pump speed until the measured flow rate equals a preselected flow rate by increasing the motor speed when the measured flow rate is below the preselected flow rate and decreasing the motor speed when the measured flow rate is above the preselected flow rate.

In another aspect, a method controls a lubrication unit having a pump and flow rate sensor. The method comprises the steps of driving the pump at a predetermined speed and measuring flow rate provided by the pump at the predetermined speed. A volume of lubricant delivered by the pump is determined from the measured flow rate and the time period during which the pump is driven. Further, the method includes stopping the pump when the determined volume of lubricant delivered equals a preselected lubricant volume.

In still another aspect, a lubrication unit for delivering lubricant in a system comprises a reservoir for holding a supply of lubricant, a motor, and an axial piston pump in fluid communication with the reservoir and having a piston driven by the motor and a cylinder of a known cross-sectional area. The piston is moveable by the motor to reciprocate axially within the cylinder through a filling stroke in which lubricant is drawn from the reservoir into the cylinder and a pumping stroke in which lubricant is pushed out of the cylinder for delivery to the system. The unit includes a flow rate sensor mounted downstream from the pump for measuring a flow rate of lubricant pushed out of the cylinder. Further, the unit has a control operatively connected to the flow rate sensor and the motor for controlling operation of the motor. The control includes an input selector for selecting at least one characteristic selected from a group consisting of a volume and a flow rate of lubricant pumped by the pump. The control adjusts motor speed to obtain the selected characteristic.

The above summary is provided to introduce a selection of concepts in simplified form that are further described below in the Detailed Description. The summary is not intended to identify key features or essential features of the claimed subject matter, nor is it intended to be used as an aid in determining the scope of the claimed subject matter. Other objects and features will be in part apparent and in part pointed out hereinafter.

BRIEF DESCRIPTION OF THE DRAWINGS

Corresponding parts are indicated by corresponding reference numbers throughout the drawings.

DETAILED DESCRIPTION

Figure 1:
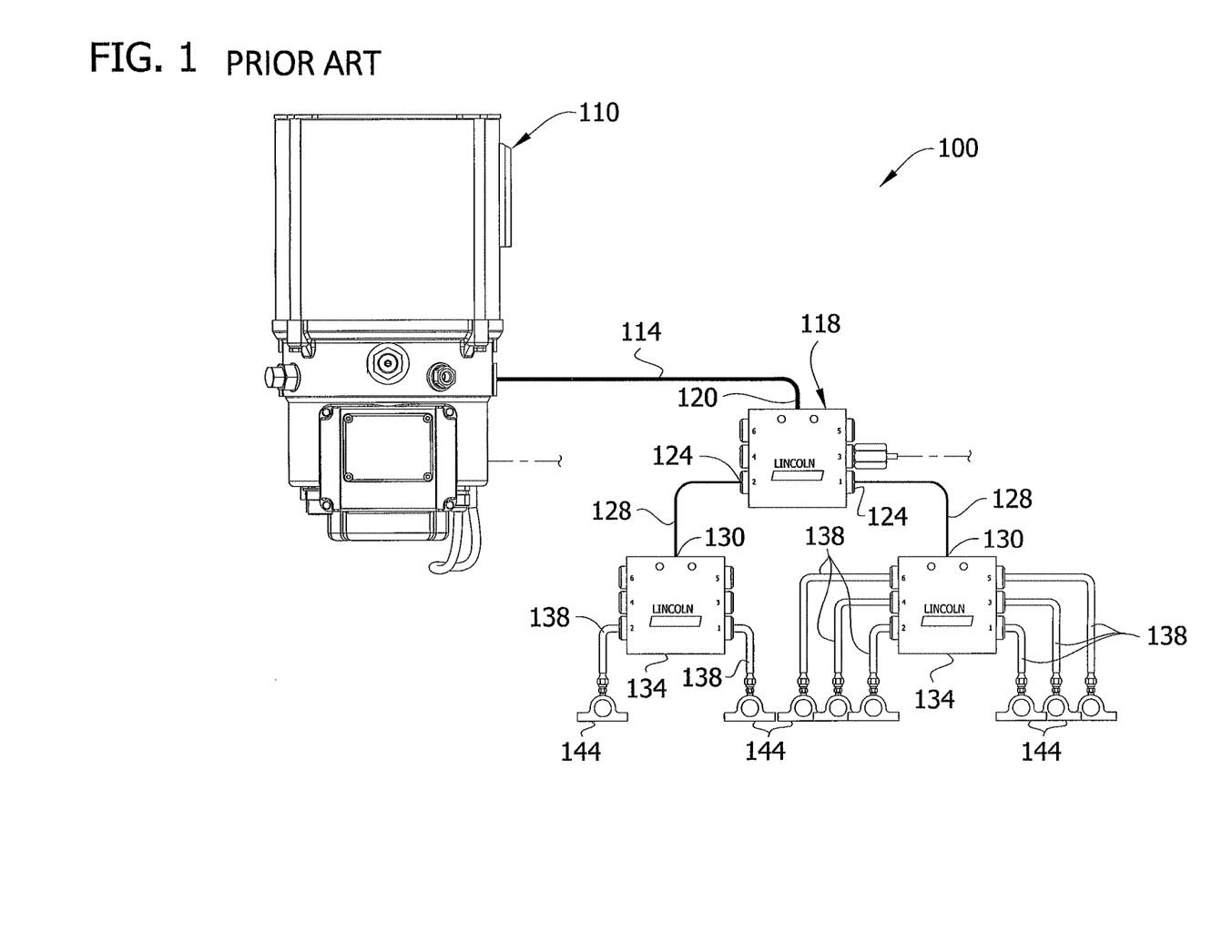
FIG. 1 is a diagram of a conventional automated lubrication system having divider valves for directing lubricant to points of lubrication.

FIG. 1 illustrates a conventional Quicklub® system, generally designated 100, comprising a pump unit 110 that operates to pump lubricant through a lube supply line 114 to a master divider valve, generally designated by 118, having an inlet 120 and multiple outlets 124 connected via lines 128 to the inlets 130 of additional (slave) divider valves, generally designated by 134. The divider valves 134 are connected via lines 138 to bearings 144 or other points of lubrication. The number of divider valves 134 used will vary depending on the number of lubrication points to be serviced.

Figure 2:
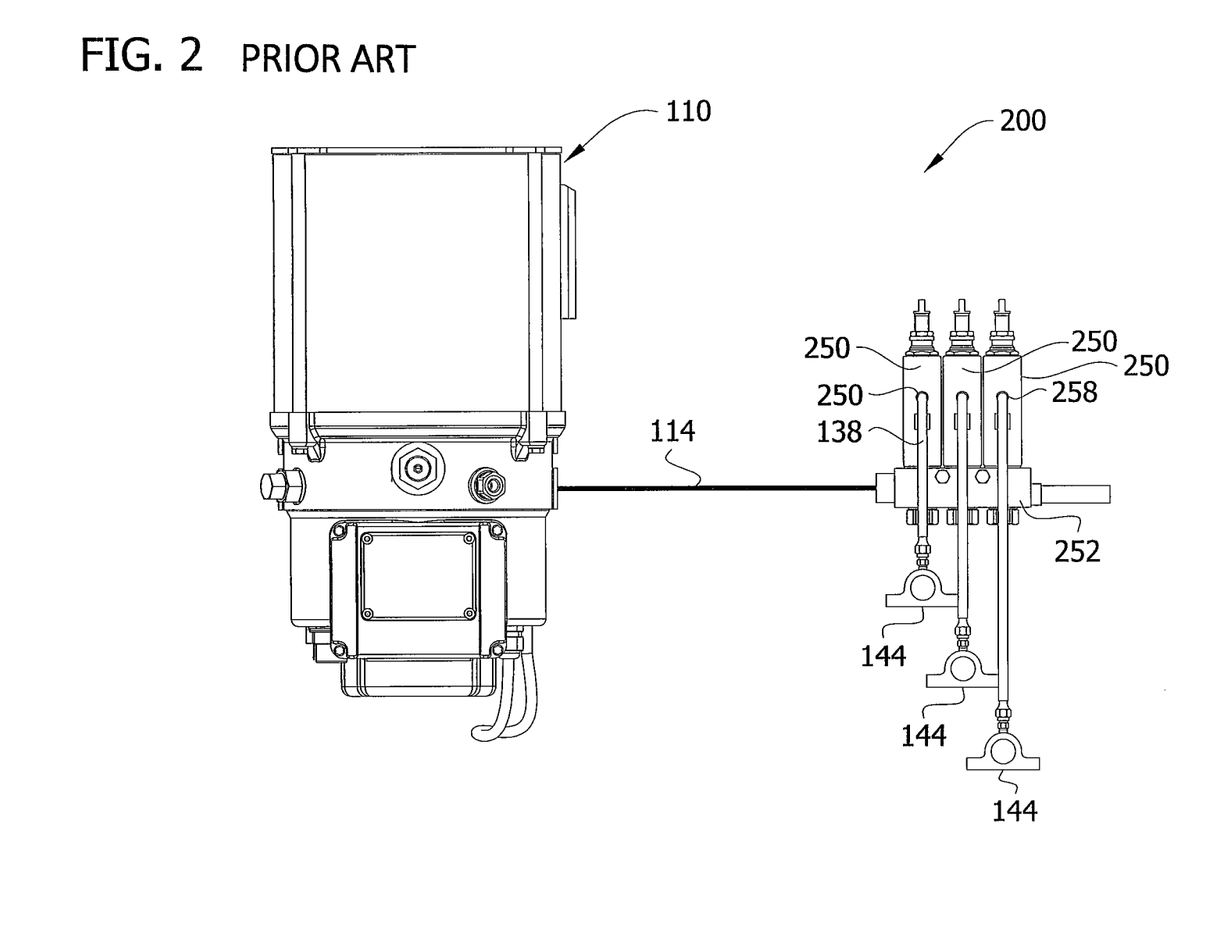
FIG. 2 is a diagram of a conventional automated lubrication system having injectors for directing lubricant to points of lubrication.

FIG. 2 illustrates a conventional Centro-Matic® system, generally designated 200, comprising a pump unit 110 that operates to pump lubricant through a lube supply line 114 to a plurality of injectors 250, each of which has an inlet communicating with the lube supply line 114 via passages in a manifold 252 and an outlet 158 connected via a line 138 to a bearing 144 or other point of lubrication.

Figure 3:
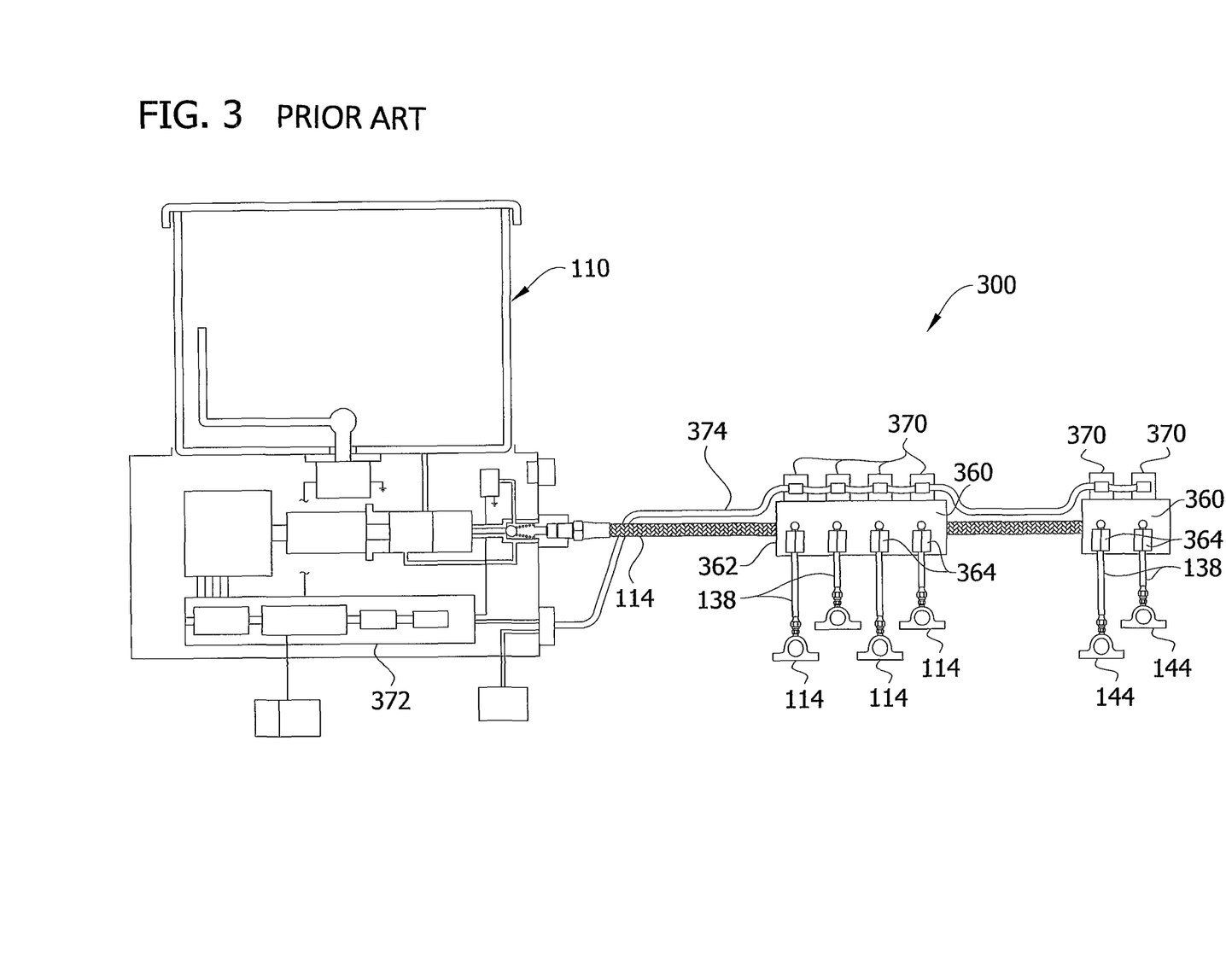
FIG. 3 is a diagram of a automated lubrication system having a CAN bus and divider valves for directing lubricant to points of lubrication.

FIG. 3 illustrates a CAN bus and zone valve system, generally designated 300, comprising a pump unit 110 that operates to pump lubricant through a lube supply line 114 to a series of manifolds 360, each of which has an inlet 362 communicating with the lube supply line 114 and a plurality of outlets 364 selectively delivering lubricant via corresponding lines 138 to corresponding bearings 144 or other points of lubrication. Electronically controlled valves 370 connected to the manifolds 360 selectively receive power and control signals from a controller 372 in the pump unit 110 via a power field bus 374 to control lubricant distribution. As shown in FIG. 3, the system may independently deliver lubricant to multiple points of lubrication.

General descriptions of these systems, including components and controls, are provided in U.S. patent application Ser. No. 13/271,814, entitled, "Pump having Venting and Non-venting Piston Return," which is incorporated by reference. As previously described, under certain conditions, the pumps do not fill completely with lubricant during the suction portion of their stroke. As a result, the controller operates the pump as if more lubricant is delivered by the pump than actually is delivered, potentially under lubricating the lubrication points.

Figure 4:
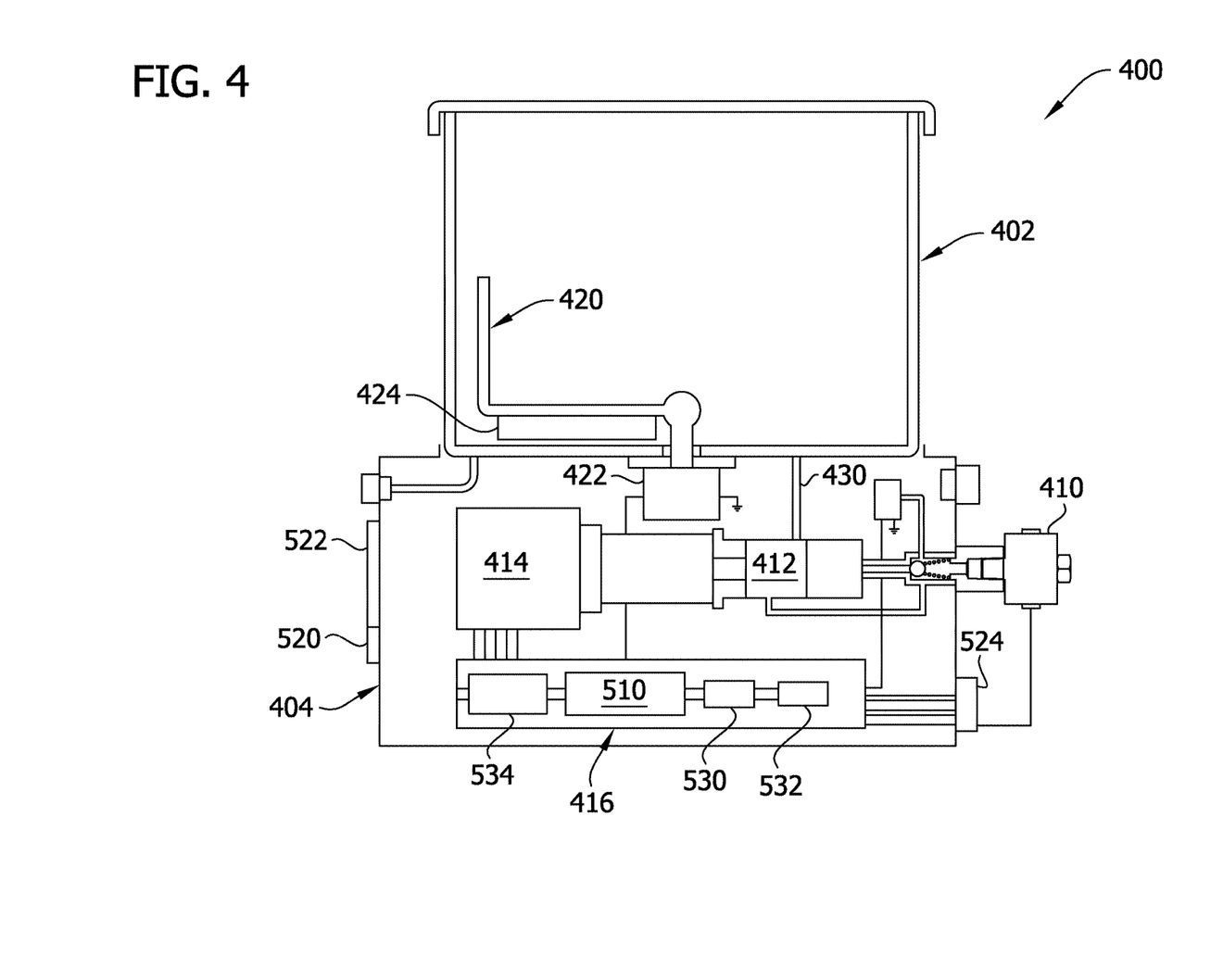
FIG. 4 is a schematic cross section of a pump unit of the present invention.

FIG. 4 schematically illustrates a pump unit or lubrication unit, generally designated by 400, of the present invention. The pump unit 400 comprises a reservoir (generally designated by 402) for holding a supply of lubricant (e.g., grease) and a pump housing (generally designated by 404) below the reservoir for housing pump and controller components of the unit. A flow rate sensor 410 is mounted on the housing 496. Although this sensor 410 is mounted directly on the unit 400 and outside the housing 496, it is envisioned that the sensor may be housed inside the housing or separated from the unit at a convenient downstream location. In addition to the previously mentioned components, the housing 496 houses a pump, generally designated by 412, a motor 414 for powering the pump, and a control unit, generally designated by 416, for controlling operation of the pump unit 400 and other lubrication system components such as those shown in FIGS. 1-3.

A stirrer, generally designated 420, is provided for stirring lubricant in the reservoir 402. The stirrer 420 rotates about a vertical axis upon operation of a drive motor 422 mounted in the pump housing 496. The drive motor 422 is operatively connected to the control unit 416 mounted in the housing 496. The stirrer 420 rotates to fluidize lubricant in the reservoir 402 and break up any air bubbles that may be in the lubricant to minimize the risk that the pump unit 400 will lose its prime. The stirrer 420 includes a blade 424 that pushes lubricant from the reservoir 402 through an outlet, i.e., through passage 430, of the reservoir.

The pushing force exerted on the lubricant by the blade 426 is complemented by a pulling force exerted on the lubricant by the pump 412. Desirably, the control unit 416 is programmed to operate the stirrer 420 and the pump 412 simultaneously so the pushing and pulling forces act together to move lubricant along the defined passage 430 into the pump. When combined, these forces are usually able to move lubricant from the reservoir 402 to the pump 412. Further, these forces are maximized because the passage 430 from the reservoir 402 to the pump 412 is closed to atmosphere along its entire length. As a result, the pump unit 400 is able to pump more viscous lubricants at lower temperatures than conventional pump units. Desirably, the inlet passage 430 is a generally straight-line path extending generally vertically. Further, the total length of the inlet passage 430 is preferably relatively short.

Figure 5:
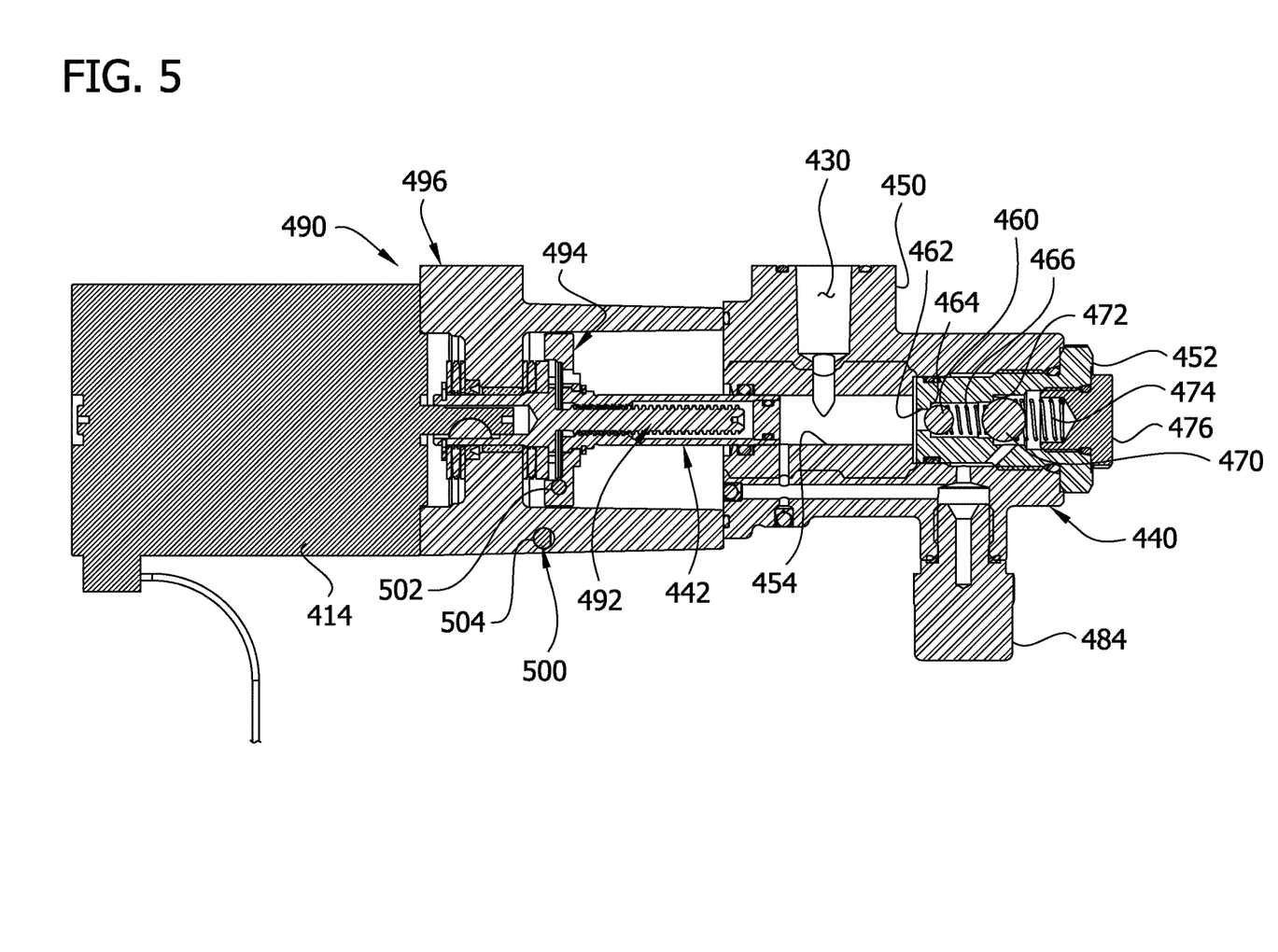
FIG. 5 is a vertical section taken through an exemplary pump used in the pump unit.
Figure 6:
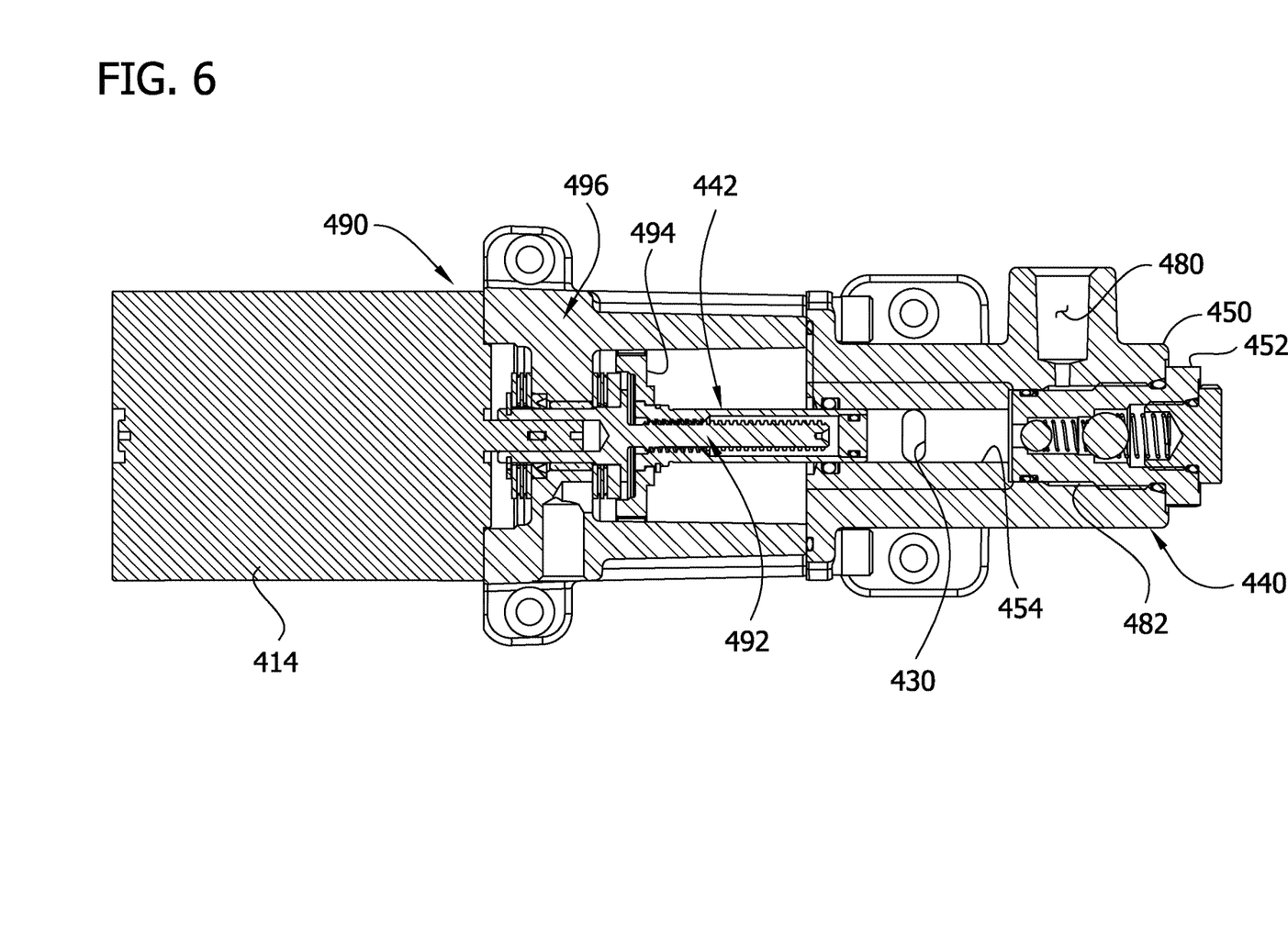
FIG. 6 is a horizontal section of the exemplary pump taken in the plane of line 6-6 of FIG. 5.

As shown in FIG. 5, the pump 412 includes a pump cylinder, generally designated by 440, and a piston, generally designated by 442, movable back and forth in the cylinder. As shown in FIGS. 5 and 6, the pump cylinder 440 comprises a cylinder body 450 and a valve housing 452 in threaded engagement with the cylinder body. The cylinder body 450 is illustrated as being made in two pieces, but it may comprise any number of parts. The cylinder body 450 has a longitudinal cylinder bore 454, in which the piston 442 reciprocates.

The cylinder inlet passage 430 has an upper portion that is substantially cylindrical (having only a small taper to facilitate manufacture) and a lower portion that is oblong (e.g., racetrack-shaped) as viewed in horizontal cross-section (see FIG. 6). The oblong configuration of the inlet passage 430 maximizes inlet passage area entering the cylinder bore 454 and reduces the effective length of the piston power stroke (i.e., the segment of the power stroke after the piston 442 has passed the cylinder inlet passage and blocked communication between the bore 454 and the inlet passage 430). As a result, the pump unit 400 has a more compact design, but pumps a larger volume of lubricant (e.g., at least 1.5 cubic centimeters) per pumping stroke of the piston 442.

Referring to FIG. 5, a first ball check valve 460 is mounted in an opening 462 extending through the valve housing 452 for movement between a closed position, in which the ball engages a first valve seat 464 on the housing to block flow through the opening during a return stroke of the piston 442, and an open position, in which the ball allows flow through the opening during a pumping stroke of the piston. A first coil compression spring 466 reacting at one end against the ball valve 460 urges the ball toward its closed position (as shown). The opposite end of the spring 466 reacts against a second ball check valve 470 mounted along the opening 462 downstream from the first ball valve 460. The second ball valve 470 is mounted in the valve housing 452 for movement in the opening 462 between a closed position in which it engages a second valve seat 472 on the housing to block flow through the opening during a return stroke of the piston 442 and an open position in which it allows flow through the opening during a pumping stroke of the piston. A second coil compression spring 474 reacting at one end against the second ball valve 470 urges the ball toward its closed position (as shown). The opposite end of the spring 474 reacts against a plug 476 threaded into the downstream end of the opening 462. Using two check valves 460, 470, instead of one check valve, reduces potential of lubricant flowing back into the cylinder bore 454 during a return stroke of the piston 442.

Referring to FIG. 6, the pump cylinder 454 has an outlet comprising an outlet port 480 in the cylinder body 450. The outlet port 480 communicates with the cylinder bore 454 via an annular gap 482 located between the valve housing 452 and the cylinder body 450 and via a connecting passage (not shown) extending between the annular gap and the opening 462 extending through the valve housing 452 at a location downstream from the second ball check valve seat 472. The flow rate sensor 410 and a pressure sensor 484 are in fluid communication with the outlet port 480 as shown in FIG. 4. Both sensors 410, 484 send signals to the control unit 416 corresponding to respective sensed characteristics.

As illustrated in FIGS. 5 and 6, a drive mechanism, generally designated 490, drives the piston 442 to reciprocate in the cylinder bore 454. In the illustrated embodiment, the drive mechanism 490 is a linear position drive mechanism comprising the stepper motor 414 in driving engagement with a lead screw 492 that is in threaded engagement with a follower 494 in a follower housing 496. The follower 494 and piston 442 are joined in a non-rotatable manner. The follower 494 and housing 496 are shaped so the follower does not rotate inside the housing as the lead screw 492 rotates. As a result, when the motor 414 rotates the lead screw 492 in one direction the piston 442 moves through a pumping (power) stroke in the cylinder bore 454, and when the motor rotates the screw in the opposite direction the piston moves through a return stroke in the cylinder bore. The lengths of the strokes are regulated by controlling operation of the stepper motor 414. Operation of the stepper motor 414 is controlled by the control unit 416 as will be explained below.

A calibration mechanism, generally designated 500 in FIG. 5, is provided for calibrating operation of the stepper motor 414 so the lengths of piston strokes are precisely controlled. In the illustrated embodiment, this mechanism 500 comprises a magnet 502 mounted on the follower 494, and at least one magnetic field sensor 504 mounted on the follower housing 496. By way of example only, the sensor 504 may be a reed switch positioned in proximity to the magnet 434.

In some embodiments, one motor may be used to drive both the pump and the stirrer. In other embodiments, the stirrer motor 422 and the stepper motor 414 are separate, distinct, independently energized motors. One advantage of using two motors is evident in colder environments when the lubricant may become stiff, resulting in an increased resistance to rotation of the stirrer. The increased resistance can slow down rotation of the motor driving the stirrer. If the motor driving the stirrer is also driving the pump, the slower rotation reduces the rate of operation of the pump and the rate at which lubricant is pumped. In contrast, when two independently energized motors are used, if the lubricant is stiff and slows down the rotation of the stirrer motor, the pump motor continues to operate independently to pump lubricant at a speed independent of the speed of the stirrer motor.

Referring to FIG. 4, the pump unit 400 includes a control unit 416 for controlling operation of the linear position drive mechanism 490. The control unit 416 receives signals from the pressure sensor 484 and the calibration mechanism 500 (e.g., magnetic field sensor 504). In one embodiment, the control unit 416 includes a programmable microprocessor 510 that processes information and controls operation of the stirrer drive motor 422 and the pump stepper motor 414, as well as other components in the lubrication system as shown in FIGS. 1-3. An operator input panel 520 having a display 522 is provided on the pump housing 404 for use by an operator for communicating instructions from the operator to the pump unit 400 and for communicating information from the control unit to the operator. This information may include the type of lubrication distribution system to be used with the pumping unit, the volume of lubricant to be delivered to each point of lubrication (e.g., bearing), and the frequency of lubrication events. Information can also be uploaded and downloaded to and from the control unit 416 via a USB port 524 on the housing 404 of the pump unit 400.

In some embodiments, the control unit 416 includes a power field bus 530 having wires for carrying messages from a communications port 532 to an electronically controlled circuit for controlling the operation of electronically-operated valves (not shown) in the lubrication system, and wires supplying power from an external power supply to an electronically-controlled actuators (not shown) for energizing a respective solenoid in the system. The power wires may be connected to a power supply of the apparatus being lubricated, or the power wires may be connected to a separate power supply. The control unit 416 also includes one or more motor drivers 534 for controlling operation of the motors 414, 422 in response to signals from the microprocessor 510.

The control unit 416 is programmable by an operator via the input panel 520 or the USB port 524 to select a desired lubricant flow rate or a desired volume of lubricant. Further, the operator may use the input panel 520 to select between a normal operation mode and an alternate (cold weather) mode. In the normal operation mode, the lubricant flow rate and volume are determined from the number of piston strokes, the known volume of lubricant pushed out of the cylinder bore 454 during each piston power stroke, and the time period. The total volume of lubricant delivered is calculated by multiplying the number of strokes by the cylinder volume, and the flow rate is calculated by dividing the total volume by the time period. In the alternate mode, the lubricant flow rate is measured by the flow rate sensor 410, and the volume is calculated by multiplying the measured flow rate by the period of time.

In some instances, the control unit 416 initiates operation of the stirrer motor 422 before operating the pump stepper motor 414 to reciprocate the piston 442. This sequence allows the stirrer 420 to fluidize the lubricant and the piston 442 to prime the pump cylinder 440 with lubricant before actual lubricant pumping begins. Stirring and priming can be especially advantageous if the lubricant is in a viscous condition, as in cold-temperature environments. After a suitable delay (e.g., eight to twelve seconds), the stepper motor 414 is energized by the motor driver 534 to drive the piston 442 through a succession of pumping (power) strokes and return strokes to pump a desired amount of lubricant through the feed lines connected downstream from the flow rate sensor 410.

The pump unit 400 is capable of pumping viscous lubricants at relatively low temperatures due at least in part to the strong push/pull forces exerted on the lubricant to force lubricant from the reservoir directly into the cylinder bore 454. As explained above, rotation of stirrer 420 causes the force-feed mechanism 500 to exert a strong downward force on lubricant in the reservoir 402 tending to push it along the defined flow path 386 to the cylinder bore 454. Further, in some embodiments, a return stroke of the piston generates a force tending to pull this same lubricant along the passage 430. The combination of these pushing and pulling forces is effective for moving viscous lubricant into the cylinder bore at lower temperatures.

As will be appreciated by those skilled in the art, the calibration mechanism 500 provides precise piston 442 stroke length information, enabling lubricant flow rate to be determined during the normal mode of operation when the pump is completely primed. By knowing the stroke length and the cross-sectional area of the cylinder bore 454, the precise volume of lubricant pumped out of the pump cylinder 440 during each piston power stroke can be calculated (i.e., volume=stroke length×bore area). By knowing the precise volume of lubricant pumped during each stroke and the number of strokes during a period of time, the exact flow rate of lubricant delivered from a completely primed pump can be determined (i.e., flow rate=volume per stroke/stroke per time). However, as previously alluded to, when the lubricant is particularly viscous, such as when the pump is operating in an environment below some predetermined temperature (e.g., 20° F.), lubricant may not complete fill the cylinder bore 454. As a result of the bore 454 being incompletely filled, the volume of lubricant delivered during each stroke is unknown, and the flow rate of lubricant cannot be calculated. Accordingly, the operator can select the alternate mode, in which the flow rate sensor 410 can be used to determine lubricant flow rate. When the flow rate sensor 410 is used, the number of piston strokes per unit of time may be adjusted to obtain a desired flow rate as measured by the sensor.

In some embodiments, it is envisioned that the control unit 416 may automatically switch to alternate mode when a signal is received from the sensor indicating the sensor is connected to the unit. In some embodiments, it is envisioned the control unit 416 may automatically rely upon calculations from piston stroke calculation until measurements received from the flow rate sensor 410 exceed the calculated flow rate by some predetermined amount (e.g., a set percentage variance or a particular flow rate difference). In still other embodiments, it is envisioned that the control unit 416 may receive signals from a sensor (e.g., a temperature sensor or a viscosity sensor, not shown) and may automatically switch to the alternate mode when the sensor measures a predetermined value.

As will be apparent to those skilled in the art, when in the alternate mode and a desired flow rate is entered, the control unit 416 adjusts pump speed until the measured flow rate equals a preselected flow rate. The unit 416 increases the motor speed when the measured flow rate is below the preselected flow rate and decreases the motor speed when the measured flow rate is above the preselected flow rate.

When in the alternate mode and a desired volume is entered, the control unit 416 determines determining a volume of lubricant delivered by the pump by multiplying the flow rate measured by the sensor 410 by elapsed the time period during which the pump is driven. The control unit 416 signals the motor driver 534 to stop the pump 412 when the calculated volume of lubricant delivered equals the preselected lubricant volume.

Other features and characteristics may be found in previously filed Patent Cooperation Treaty Application No. PCT/US2011/057592, which is incorporated herein by reference.

As will be appreciated by those skilled in the art, features of each of the previously described embodiments may be combined with features of other embodiments. These combinations are envisioned as being within the scope of the present invention.

Embodiments of the invention may be described in the general context of data and/or computer-executable instructions, such as program modules, stored one or more tangible computer storage media and executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computers and/or servers may execute the computer-executable instructions such as those illustrated herein to implement aspects of the invention.

Embodiments of the invention may be implemented with computer-executable instructions. The computer-executable instructions may be organized into one or more computer-executable components or modules on a tangible computer readable storage medium. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a", "an", "the", and "said" are intended to mean that there are one or more of the elements. The terms "comprising", "including", and "having" are intended to be inclusive and mean that there may be additional elements other than the listed elements.

In view of the above, it will be seen that several advantages of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The Abstract and Summary are provided to help the reader quickly ascertain the nature of the technical disclosure. They are submitted with the understanding that they will not be used to interpret or limit the scope or meaning of the claims.

The above description illustrates the invention by way of example and not by way of limitation. When two items or multiple items are illustrated, it is contemplated that the invention may include two or more items. This description enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

The invention claimed is:

1. A lubrication unit for delivering lubricant in a system, said unit comprising:
    a reservoir for holding a supply of lubricant;
    a motor;
    an axial piston pump in fluid communication with the reservoir and having a piston driven by the motor and a cylinder of a known cross-sectional area, said piston being moveable by the motor to reciprocate axially within the cylinder through a filling stroke in which lubricant is drawn from the reservoir into the cylinder and a pumping stroke in which lubricant is pushed out of the cylinder for delivery to the system;
    a flow rate sensor mounted downstream from the pump for measuring a flow rate of lubricant pushed out of the cylinder; and
    a control unit operatively connected to the flow rate sensor and the motor for controlling operation of the motor, the control unit including an input selector configured for selecting between controlling motor speed based on at least one characteristic selected from a group consisting of volume of lubricant pumped by the pump and flow rate of lubricant pumped by the pump.

2. A lubrication unit as set forth in claim 1, wherein the input selector is configured for selecting between controlling motor speed based on flow rate sensor output and number of piston strokes.

3. A lubrication unit as set forth in claim 1, in combination with a plurality of injectors, each injector of said plurality of injectors being in fluid communication with the lubrication unit for selectively delivering lubricant to lubrication points.

4. A lubrication unit as set forth in claim 1, in combination with a valve in fluid communication with the lubrication unit for selectively delivering lubricant to lubrication points.

5. A lubrication unit as set forth in claim 4, wherein said valve is a master divider valve, the lubrication unit being further in combination with a plurality of slave divider valves, each slave valve of said plurality of slave valves being in fluid communication with the master divider valve for delivering lubricant to lubrication points.

6. A lubrication unit as set forth in claim 4, wherein said valve is an electronically controlled master valve, the lubrication unit being further in combination with a plurality of electronically controlled valves, each valve of said plurality of electronically controlled valves being operatively connected to the control unit and in fluid communication with the lubrication unit for selectively delivering lubricant to lubrication points.

* * * * *